(12) United States Patent
Zhou et al.

(10) Patent No.: US 9,330,604 B2
(45) Date of Patent: May 3, 2016

(54) ORGANIC LIGHT-EMITTING DIODE PIXEL CIRCUIT, DRIVE METHOD THEREOF, AND DISPLAY DEVICE

(71) Applicants: BOE Technology Group Co., Ltd., Beijing (CN); Chengdu BOE Optoelectronics Technology Co., Ltd., Chengdu (CN)

(72) Inventors: Quanguo Zhou, Beijing (CN); Xiaojing Qi, Beijing (CN)

(73) Assignees: BOE Technology Group Co., Ltd., Beijing (CN); Chengdu BOE Optoelectronics Technology Co., Ltd, Chengdu, Sichuan (CN)

( * ) Notice: Subject to any disclaimer, the term of this patent is extended or adjusted under 35 U.S.C. 154(b) by 19 days.

(21) Appl. No.: 14/361,716

(22) PCT Filed: Dec. 2, 2013

(86) PCT No.: PCT/CN2013/088329
§ 371 (c)(1),
(2) Date: May 30, 2014

(87) PCT Pub. No.: WO2015/014056
PCT Pub. Date: Feb. 5, 2015

(65) Prior Publication Data
US 2015/0035798 A1  Feb. 5, 2015

(30) Foreign Application Priority Data
Jul. 31, 2013  (CN) .......................... 2013 1 0329529

(51) Int. Cl.
*G06F 3/041* (2006.01)
*G09G 3/32* (2016.01)
*G06F 3/044* (2006.01)

(52) U.S. Cl.
CPC ............ *G09G 3/3266* (2013.01); *G09G 3/3233* (2013.01); *G06F 3/041* (2013.01);
(Continued)

(58) Field of Classification Search
CPC combination set(s) only.
See application file for complete search history.

(56) References Cited

U.S. PATENT DOCUMENTS 7,456,812 B2   11/2008  Smith et al.
7,532,182 B2   5/2009   Tseng et al.
(Continued)

FOREIGN PATENT DOCUMENTS

CN   1669067 A    9/2005
CN   101471034 A  7/2009
(Continued)

OTHER PUBLICATIONS

Office action and search report issued by Chinese Patent Office for priority application 201310329529.3 dated Dec. 24, 2014.

*Primary Examiner* — Linh N Hoffner
(74) *Attorney, Agent, or Firm* — Frommer Lawrence & Haug LLP (57) ABSTRACT

The present invention belongs to the field of display technology, and provides an OLED pixel circuit, a drive method thereof and a display device, which may solve the problem of relatively complicated control circuit and manufacturing process of an existing in-cell touch screen. In the OLED pixel circuit of the present invention, the data writing unit is for writing power supply voltage signal and data line voltage signal into the storage unit; the storage unit is for supplying voltage to the drive unit; the touch detecting unit is for sensing touch and generating a detecting signal; the drive unit is for converting the detecting signal into a touch output signal and for providing drive current for the OLED; and the light-emitting control unit is for turning on the drive unit and the OLED. The present invention may allow the touch display device to be thinner and lighter.

15 Claims, 6 Drawing Sheets

(52) U.S. Cl.
CPC .............. *G06F 3/044* (2013.01); *G06F 3/0416* (2013.01); *G09G 2300/0819* (2013.01); *G09G 2300/0842* (2013.01); *G09G 2300/0861* (2013.01); *G09G 2320/0295* (2013.01); *G09G 2320/043* (2013.01); *G09G 2360/148* (2013.01)

(56) References Cited

U.S. PATENT DOCUMENTS

| | | | |
|---|---|---|---|
| 2005/0007353 A1 | 1/2005 | Smith et al. | |
| 2006/0214893 A1 | 9/2006 | Tseng et al. | |
| 2006/0231740 A1* | 10/2006 | Kasai | G09G 3/3233 250/214.1 |
| 2013/0063403 A1 | 3/2013 | Sugita et al. | |
| 2014/0118211 A1* | 5/2014 | Cooper et al. | 343/795 |
| 2014/0168127 A1* | 6/2014 | Yang | 345/173 |
| 2015/0103037 A1* | 4/2015 | Wu et al. | 345/174 |
| 2015/0221255 A1* | 8/2015 | Qing et al. | 345/173 |

FOREIGN PATENT DOCUMENTS

| | | |
|---|---|---|
| CN | 102768447 A | 11/2012 |
| CN | 103208255 A | 7/2013 |
| CN | 103218972 A | 7/2013 |
| CN | 203502926 U | 3/2014 |
| CN | 203520345 U | 4/2014 |
| JP | 2011-221327 A | 11/2011 |
| JP | 2012208263 A | 10/2012 |
| KR | 10-0660865 B | 12/2006 |
| KR | 10-2012-0034502 A | 4/2012 |
| TW | I253846 B | 4/2006 |

* cited by examiner

ORGANIC LIGHT-EMITTING DIODE PIXEL CIRCUIT, DRIVE METHOD THEREOF, AND DISPLAY DEVICE

This application is a 371 of PCT/CN2013/088329 filed on Dec. 2, 2013, which claims priority benefits from Chinese Patent Application Number 201310329529.3 filed Jul. 31, 2013, the disclosure of which is incorporated herein by reference.

FIELD OF THE INVENTION

The present invention relates to the field of touch display technology, and particularly, to an organic light-emitting diode (OLED) pixel circuit, a drive method thereof, and a display device.

DESCRIPTION OF THE RELATED ART

Touch screen, as one of the simplest, most convenient, and most natural human-machine interaction devices, has been widely applied in various electronic devices, such as mobile phones, notebook computers, digital cameras and the like. Touch screens, according to the way they are mounted, may be classified into two types, namely, external touch screens and in-cell touch screens. An external touch screen is formed by arranging a touch device, which generally includes a touchpad and a protection layer e.g. gorilla glass), on a display panel, the touchpad is disposed on the display panel, and the touch screen operates based on the change in light or pressure sensed by the touchpad.

In in-cell touch screen technique, the function of sensing signals by a touchpad is embedded in a pixel circuit, and by loading a control circuit, the display screen is capable of sensing touch signals.

The inventors found that at least the following problems exist in the prior art: for an in-cell touch screen, as the function of sensing signals by the touchpad is embedded in the pixel circuit, its control circuit and manufacturing process are relatively complicated, which is unfavorable for improving production yield and production efficiency. In addition, for the in-cell touch screen, its pixel aperture ratio may be decreased, which further results in degraded display quality of display screen.

SUMMARY OF THE INVENTION

Objects to be achieved by the present invention are to provide an OLED pixel circuit whose control circuit and manufacturing process are relatively simple, a drive method thereof and a display device, aiming at the above problem in the prior art that the control circuit and manufacturing process of an in-cell touch screen are relatively complicated, which is unfavorable for improving production yield and production efficiency.

A technical solution used to solve the technical problem of the present invention is an OLED pixel circuit, comprising:
a data writing unit, a storage unit, a drive unit, an OLED, a light-emitting control unit and a touch detecting unit; wherein,
the data writing unit, in a touch detecting stage and an OLED light-emitting stage, is used for writing a power supply voltage signal into the storage unit under the control of a light-emitting control line and a scanning line, and writing a data line voltage signal into the storage unit under the control of the scanning line;
the storage unit is used for supplying voltage to the drive unit;
the touch detecting unit, in the touch detecting stage, is used for sensing touch under the control of a touch signal level control line, and generating a detecting signal;
the drive unit, in the touch detecting stage, is used for converting the detecting signal into a touch output signal, which is output via the touch detecting unit, under the control of the touch signal level control line, and, in the OLED light-emitting stage, is used for providing drive current for the OLED; and
the light-emitting control unit, in the OLED light-emitting stage, is used for turning on the drive unit and the OLED under the control of the touch signal level control line.

Preferably, the storage unit comprises a storage capacitor.

Preferably, the drive unit comprises a fourth thin film transistor (TFT), and a gate of the fourth TFT is connected to a first end of the storage capacitor.

Preferably, the data writing unit comprises a first TFT, a second TFT, a third TFT, a fifth TFT, a sixth TFT and a seventh TFT; wherein,
a gate of the first TFT is connected to the light-emitting control line, and a drain of the first TFT is grounded;
a gate of the second TFT is connected to the scanning line, and a drain of the second TFT is grounded;
a gate of the third TFT is connected to the scanning line, and a drain of the third TFT is connected to a source of the first TFT;
a gate of the fifth TFT is connected to the scanning line, a source of the fifth TFT is connected to a power line, and a drain of the fifth TFT is connected to a second end of the storage capacitor and a source of the second TFT;
a gate of the sixth TFT is connected to the scanning line, a source of the sixth TFT is connected to the data line, and a drain of the sixth TFT is connected to a source of the fourth TFT; and
a gate of the seventh TFT is connected to the scanning line, a source of the seventh TFT is connected to the power line, and a drain of the seventh TFT is connected to the source of the fourth TFT.

Preferably, a cathode of the OLED is grounded.

Preferably, the light-emitting control unit comprises a eighth TFT, a source of the eighth TFT is connected to a drain of the fourth TFT, a gate of the eighth TFT is connected to the touch signal level control line, and a drain of the eighth TFT is connected to the source of the first TFT and an anode of the OLED.

Preferably, the touch detecting unit comprises a photodiode, a ninth TFT and a tenth TFT, wherein,
a cathode of the photodiode is connected to the first end of the storage capacitor;
a source of the ninth TFT is connected to the power line, a drain or the ninth TFT is connected to an anode of the photodiode, and a gate of the ninth TFT is connected to the touch signal level control line; and
a source of the tenth TFT is connected to the drain of the fourth TFT, a gate of the tenth TFT is connected to the touch signal level control line, and a drain of the tenth TFT is connected to a sensor line.

Preferably, the first TFT, the second TFT, the seventh TFT, the ninth TFT and the tenth TFT are N-type TFTs, while the third TFT, the fourth TFT, the fifth TFT, the sixth TFT, the eighth TFT are P-type TFTs; alternatively, the first TFT, the second TFT, the seventh TFT, the ninth TFT, the fourth TFT and the tenth TFT are P-type TFTs, while the third TFT, the fifth TFT, the sixth TFT, the eighth TFT are N-type TFTs.

Preferably, the first to ninth TFTs are any one of polycrystalline silicon TFT, monocrystalline silicon TFT, oxide TFT and organic TFT.

Preferably, the OLED is a top-emitting LED.

The OLED pixel circuit of the present invention comprises the photodiode, which renders the display screen capable of directly sensing a signal generated by a touch, such that the control circuit of the pixel and the manufacturing process are simplified, this further improves production efficiency and production yield, and most importantly, helps to reduce cost. Meanwhile, the OLED pixel circuit can compensate non-uniformity of the threshold voltage of a TFT, thus improving picture uniformity of the organic light emitting display. In addition, two layers of indium tin oxide films are omitted in production process, and therefore light transmittance can be effectively improved, thus improving display quality of the display screen.

The present invention also provides a display device, which comprises the above-mentioned OLED pixel circuit.

The display device of the present invention includes the above OLED pixel circuit, and accordingly, it is thinner in overall thickness, lighter in weight, and lower in production cost. By providing the above circuit in each sub-pixel, sensitivity of the display screen to a touch may be significantly improved, furthermore, the photodiode works by sensing the change of light, and therefore, floating touch can be achieved on the display screen.

The present invention also provides a drive method of the above OLED pixel circuit, and the drive method comprises a touch detecting stage and an OLED light-emitting stage, wherein, the touch detecting stage comprises:

the scanning line controlling the second TFT and the seventh TFT to be turned off, and controlling the third TFT, the fifth TFT and the sixth TFT to be turned on, the light-emitting control line controlling the first TFT to be turned on, the touch signal level control line controlling the eighth TFT to be turned on, and controlling the touch detecting module to be turned off, and the fourth TFT going into saturation state;

the scanning line controlling the second TFT and the seventh TFT to be turned off; and controlling the third TFT, the fifth TFT and the sixth TFT to be turned on, the light-emitting control line controlling the first TFT to be turned off, and the touch signal level control line controlling the eighth TFT to be turned on, and controlling the touch detecting module to be turned off;

the scanning line controlling the second TFT and the seventh TFT to be turned on, and controlling the third TFT, the fifth TFT and the sixth TFT to be turned off, the light-emitting control line controlling the first TFT to be turned on, and the touch signal level control line controlling the eighth TFT to be turned on, and controlling the touch detecting module to be turned off; and the seaming line controlling the second TFT and the seventh TFT to be turned on, and controlling the third TFT, the fifth TFT and the sixth TFT to be turned off, the light-emitting control line controlling the first TFT to be turned on, and the touch signal level control line controlling the eighth TFT to be turned off, and controlling the touch detecting module to be turned on, and wherein in the OLED light-emitting stage, the touch signal level control line controls the touch detecting module to be turned off, and controls the eighth TFT to be turned on, and the OLED light-emitting stage comprises:

the scanning line controlling the second TFT and the seventh TFT to be turned off, and controlling the third TFT, the fifth TFT and the sixth TFT to be turned on, the light-emitting control line controlling the first TFT to be turned on, and the fourth TFT going into saturation state;

the scanning line controlling the second TFT and the seventh TFT to be turned off, and controlling the third TFT, the fifth TFT and the sixth TFT to be turned on, and the light-emitting control line controlling the first TFT to be turned off; and the scanning line controlling the second TFT and the seventh TFT to be turned on, and controlling the third TFT, the fifth TFT and the sixth TFT to be turned off, the light-emitting control line controlling the first TFT to be turned off, and the fourth TFT driving the OLED to emit light.

The drive method of the OLED pixel circuit of the present invention has less control signals, simple timing, and an easy-to-implement circuit, and is convenient and practical.

Reference numerals are: T1: first TFT; T2: second TFT; T3: third TFT; T4: fourth TFT; T5: fifth TFT; T6: sixth TFT; T7: seventh TFT; T8: eighth TFT; T9: ninth TFT; T10: tenth TFT; PD: photodiode; OLED: OLED; DD: power line; EM: light-emitting control line; scan: scanning line; data: data line; select: touch signal level control line; Cst: storage capacitor; sensor line: sensor line.

DETAILED DESCRIPTION OF THE PREFERRED EMBODIMENTS

For better understanding of the technical solutions of the present invention by the person skilled in the art, the present invention will be further described in detail in conjunction with the accompanying drawings and specific implementations.

Embodiment 1

Figure 1:
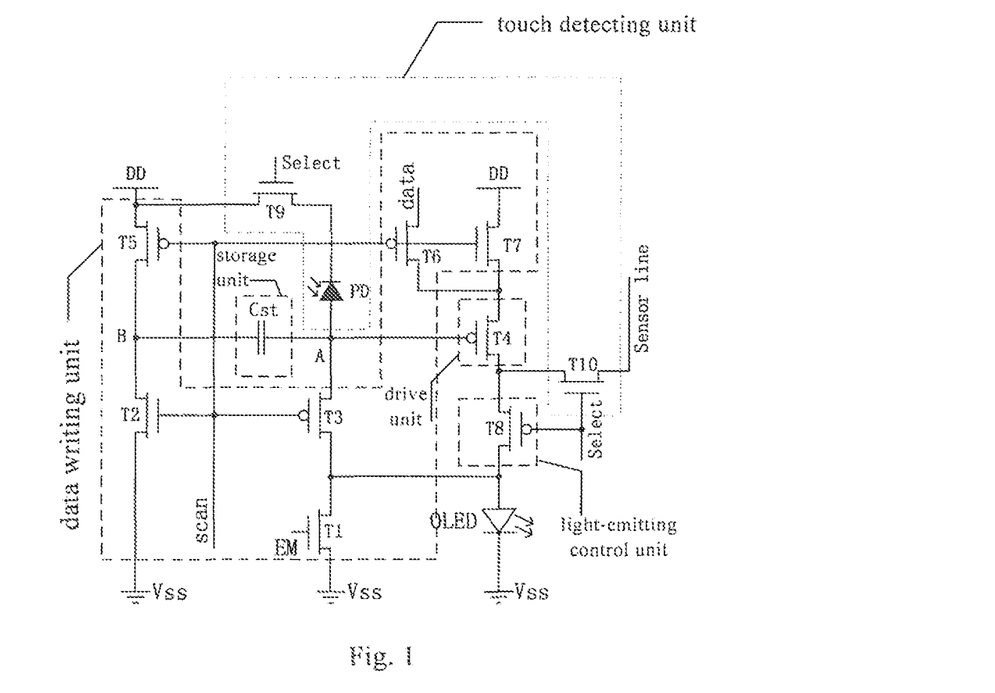
FIGS. 1 and 3 are schematic diagrams of OLED pixel circuits provided by Embodiment 1 of the present invention, respectively.

This embodiment provides an OLED pixel circuit, and as shown in FIG. 1, the OLED pixel circuit comprises:

a data writing unit, a storage unit, a drive unit, an organic light-emitting diode OLED, a light-emitting control unit and a touch detecting unit; wherein, the data writing unit, in a touch detecting stage and an OLED light-emitting stage, is used for writing a power supply voltage signal into the storage unit under the control of a light-emitting control line and a scanning line, and writing a data line voltage signal into the storage unit under the control of the scanning line;

the storage unit is used for supplying voltage to the drive unit;

the touch detecting unit, in the touch detecting stage, is used for sensing touch under the control of a touch signal level control line, and generating a detecting signal;

the drive unit, in the touch detecting stage, is used for converting the detecting signal into a touch output signal, which is output via the touch detecting unit, for example, to a drive integrated circuit (IC) (the drive IC here may be, for example, a drive IC of a touch panel), under the control of the touch signal level control line, and in the OLED light-emitting stage, is used for providing drive current for the OLED: and the light-emitting control unit, in the OLED light-emitting stage, is used for turning on the drive unit and the OLED under the control of the touch signal level control line. In this embodiment, preferably, the data writing unit comprises a first TFT T1, a second TFT T2, a third TFT T3, a fifth TFT T5, a sixth TFT T6 and a seventh TFT T7; the storage unit comprises a storage capacitor the drive unit comprises a fourth TFT T4, the light-emitting control unit comprises a eighth TFT T8; and the touch detecting unit comprises a photodiode PD, a ninth TFT T9 and a tenth TFT T10.

Specifically, cathode of the OLED OLED is grounded. Further preferably, the OLED OLED is a top-emitting OLED.

For the first TFT T1, its gate is connected to the light-emitting control line EM, and its drain is grounded.

For the second TFT T2, its gate is connected to the scanning line scan, and its drain is grounded.

For the third TFT T3, its gate is connected to the scanning line scan, and its drain is connected to a source of the first TFT T1.

For the storage capacitor Cst, its first end is connected to a source of the third TFT T3.

For the fourth TFT T4, its gate is connected to the first end of the storage capacitor Cst.

For the fifth TFT T5, its gate is connected to the scanning line scan, its source is connected to a power line DD, and its drain is connected to a second end of the storage capacitor Cst and a source of the second TFT T2.

For the sixth TFT T6, its gate is connected to the scanning line scan, its source is connected to the data line data, and its drain is connected to a source of the fourth TFT T4.

For the seventh TFT T7, its gate is connected to the scanning line scan, its source is connected to the power line DD, and its drain is connected to the source of the fourth TFT T4.

For the eighth TFT T8, its source is connected to drain of the fourth TFT T4, its gate is connected to the touch signal level control line select, and its drain is connected to the source of the first TFT T1 and anode of the OLED OLED.

For the photodiode PD, its cathode is connected to the first end of the storage capacitor Cst;

For the ninth TFT T9, its source is connected to the power line PD, its drain is connected to anode of the photodiode PD, and its gate is connected to the touch signal level control line select.

For the tenth TFT T10, its source is connected to the drain of the fourth TFT T4, its gate is connected to the touch signal level control line select, and its drain is connected to a sensor line sensor line, In this embodiment the first TFT T1, the second TFT T2, the seventh TFT T7, the ninth TFT T9 and the tenth TFT T10 are preferably N-type TFTs, while the third TFT T3, the fourth TFT T4, the fifth TFT T5, the sixth TFT T6 and the eighth TFT T8 are preferably P-type TFTs.

Preferably, each TFT is any one of polycrystalline silicon TFT, monocrystalline silicon TFT, oxide TFT and organic TFT.

The OLED pixel circuit of this embodiment comprises a photodiode, which renders the display screen capable of directly sensing a signal generated by a touch, such that the control circuit of the pixel and the manufacturing process are simplified, this further improves production efficiency and production yield, and most importantly, helps to reduce cost. Meanwhile, the OLED pixel circuit of the present invention can compensate non-uniformity of the threshold voltage of a TFT thus improving picture uniformity of an organic light emitting display. In addition, two layers of indium tin oxide films (i.e., a drive layer (Tx) and a sensing layer (Rx) included in an existing touch screen) are omitted in production process, and therefore light transmittance can be effectively improved, thus improving display quality of the display screen.

Figure 2:
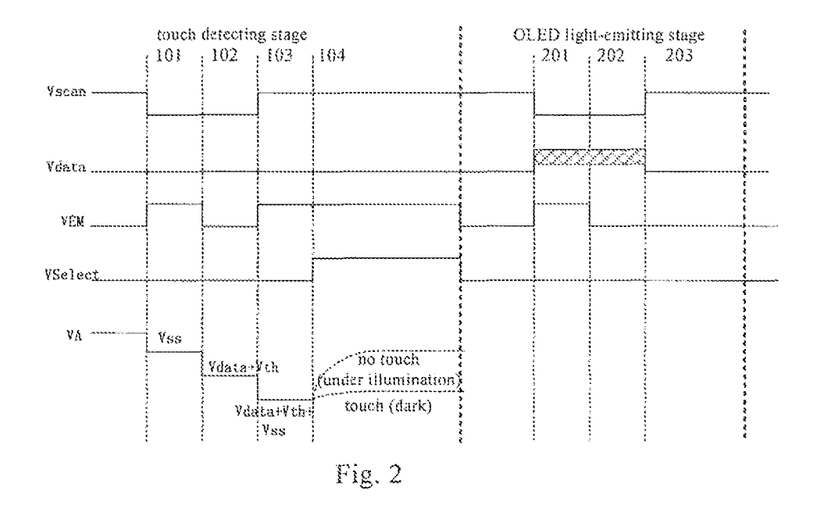
FIGS. 2 and 4 are timing diagrams of driving the OLED pixel circuits shown in FIGS. 1 and 3, respectively.

As shown in FIG. 2, a drive method of the OLED pixel circuit comprises a touch detecting stage and an OLED light-emitting stage. Thereinafter, the working process of the OLED pixel circuit provided by Embodiment 1 of the present invention will be described in detail with reference to FIGS. 1 and 2.

Stage 1: the touch detecting stage, this stage specifically comprises the phases as below.

Figure 5:
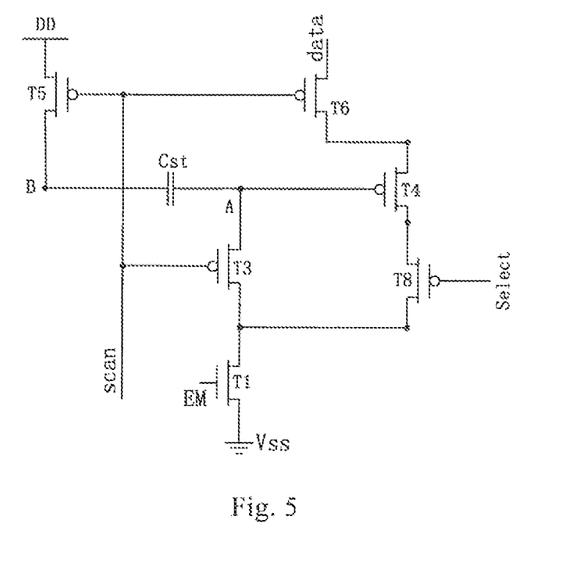
FIG. 5 is an equivalent circuit diagram of an OLED pixel circuit provided by Embodiment 1 of the present invention in an initialization phase of a touch detecting stage.

Phase 101 is an initialization phase, and its equivalent circuit diagram is illustrated in FIG. 5. In this phase, the data line data is at a low level, and the scanning line scan is at a low level, which control the second and seventh TFTs T2 and T7 to be turned off, and control the third, fifth and sixth TFTs T3, T5 and T6 to be turned on the light-emitting control line EM is at a high level, which controls the first TFT T1 to be turned on; the touch signal level control line select is at a low level, which controls the eighth TFT T8 to be turned on and controls the touch detecting module to be turned off.

Accordingly, the power signal is transmitted to the second end of the storage capacitor Cst via the fifth TFT T5, so as to charge the storage capacitor Cst, the voltage at Point A is GND level with a value of Vss, and fourth TFT T4 goes into saturation state.

Figure 6:
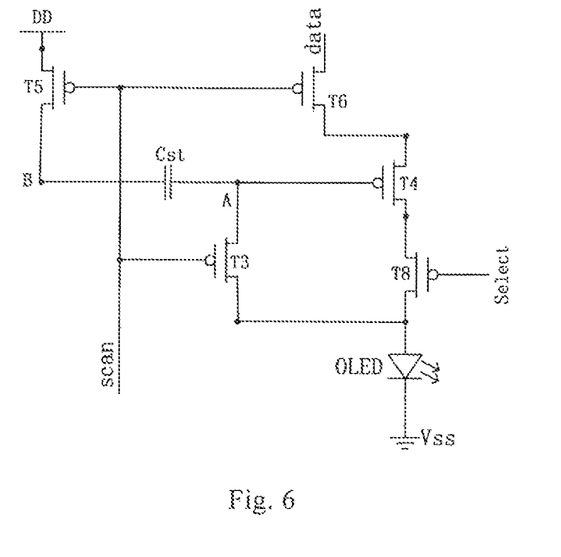
FIG. 6 is an equivalent circuit diagram of the OLED pixel circuit provided by Embodiment 1 of the present invention in a data voltage signal writing phase of the touch detecting stage.

Phase 102 is a data voltage signal writing phase, and its equivalent circuit diagram is illustrated in FIG. 6. In this phase, the data line data is at a low level, and the scanning line scan is at a low level, which control the second and seventh TFTs T2 and T7 to be turned off, and control the third, fifth and sixth TFTs T3, T5 and T6 to be turned on; the light-emitting control line EM is at a low level, which controls the first TFT T1 to be turned off; the touch signal level control line select is at a low level, which controls the eighth TFT T8 to be turned on and controls the touch detecting module to be turned off.

Accordingly, the fourth TFT T4 operates in the saturation region, such that data voltage signal is transferred to Point A via the sixth TFT T6 and the fourth TFT T4, and the voltage at Point A is Vdata+Vth. Here, Vdata is the voltage of the data line data, and Vth is the threshold voltage of the fourth TFT T4.

Figure 7:
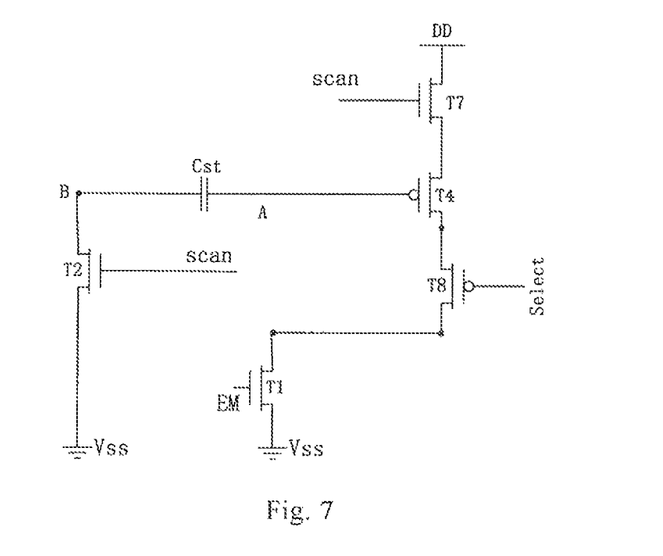
FIG. 7 is an equivalent circuit diagram of the OLED pixel circuit provided by Embodiment 1 of the present invention in a ground (GND) level writing phase of the touch detecting stage.

Phase 103 is a GND level writing phase, and its equivalent circuit diagram is illustrated in FIG. 7 in this phase, the data line data is at a low level, and the scanning line scan is at a high level, which control the second and seventh TFTs T2 and T7 to be turned on, and control the third, fifth and sixth TFTs T3, T5 and T6 to be turned off; the light-emitting control line EM is at a high level, which controls the first TFT T1 to be turned on; the touch signal level control line select is at a low level, which controls the eighth TFT T8 to be turned on and controls the touch detecting module to be turned off.

Accordingly, the GND level Vss is transferred to Point B via the second TFT T2, and at this point, as Point A is floating, the level at Point A is changed from Vdata+Vth to Vdata+Vth+Vss.

Figure 8:
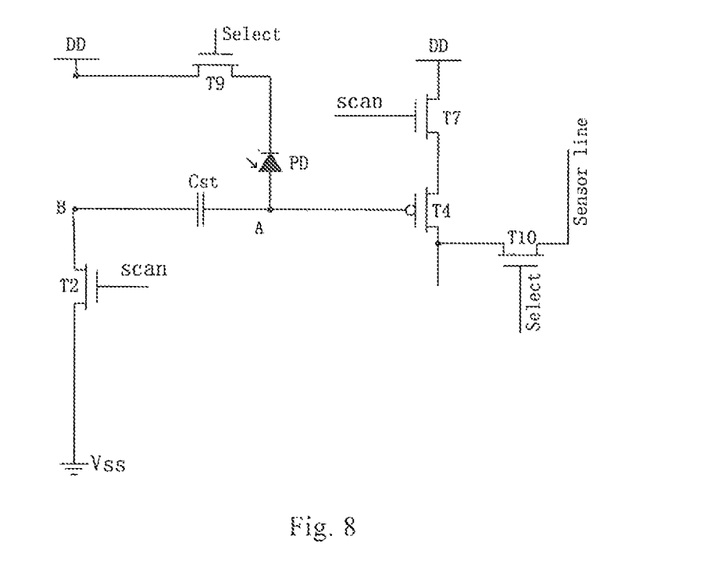
FIG. 8 is an equivalent circuit diagram of the OLED pixel circuit provided by Embodiment 1 of the present invention in a touch-generating signal detecting phase of the touch detecting stage.

Phase 104 is a touch-generating signal detecting phase, and its equivalent circuit diagram is illustrated in FIG. 8. In this phase, the data line data is at a low level, and the scanning line scan is at a high level, which control the second and seventh TFTs T2 and T7 to be turned on, and control the third, fifth and sixth TFTs T3, T5 and T6 to be turned off; the light-emitting control line EM is at a high level, which controls the first TFT T1 to be turned on; the touch signal level control line select is at a high level, which controls the eighth TFT T8 to be turned off and controls the touch detecting module to be turned on.

Accordingly, the power signal is transferred to the drain of the fourth TFT T4 via the seventh TFT T7, and the voltage of the drain is VDD. At this point, if the photodiode PD is under illumination, the charges in the storage capacitor Cst greatly decrease due to the leakage current resulting from the illumination on the photodiode PD. Consequently, the voltage at point A is greatly reduced, which may reduce the current flowing through the fourth TFT T4. If the photodiode PD is under a touch (at this condition, light is weakened or eliminated), compared to the condition that the photodiode PD is under illumination, the photodiode PD generates little or no leakage current, and accordingly, the current flowing through the fourth TFT T4 is slightly reduced or keep unchanged. The above current flowing through the fourth TFT T4 may flow though the tenth TFT T10, and then be transmitted to the drive IC (not shown in FIG. 1) for detection and analysis via the sensor line sensor line.

Stage 2: OLED Light-Emitting Stage

During this stage, the touch signal level control line select is at a low level, which controls the touch detecting module to be turned off and controls the eighth TFT T8 to be turned on, and this stage specifically comprises the phases as below.

Figure 9:
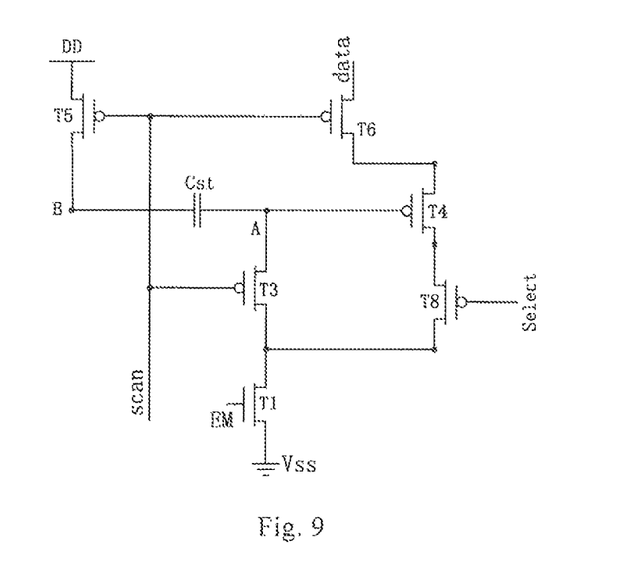
FIG. 9 is an equivalent circuit diagram of an OLED pixel circuit provided by Embodiment 1 of the present invention in an initialization phase of an OLED light-emitting stage.

Phase 201 is a pre-charging phase, and its equivalent circuit diagram is illustrated in FIG. 9. In this phase, the data line data is at a high level, and the scanning line scan is at a low level, which control the second and seventh TFTs T2 and T7 to be turned off, and control the third, fifth and sixth TFTs T3, T5 and T6 to be turned on the light-emitting control line EM is at a high level, which controls the first TFT T1 to be turned on. The fourth TFT T4 goes into saturation state, and at this point the level at point A is Vss.

Figure 10:
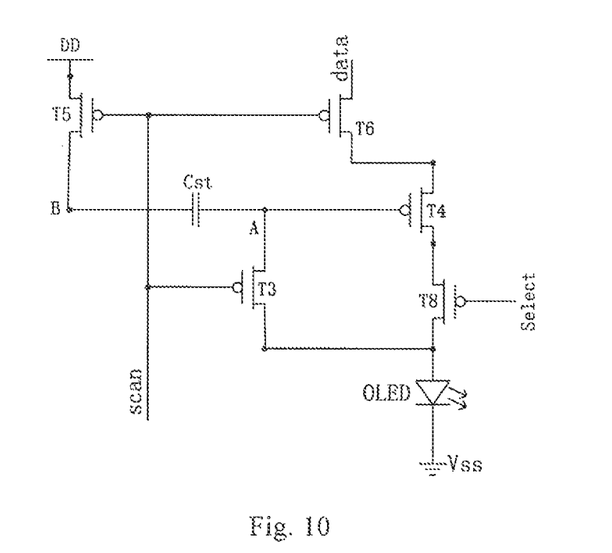
FIG. 10 is an equivalent circuit diagram of an OLED pixel circuit provided by Embodiment 1 of the present invention in a data voltage signal writing phase of the OLED light-emitting stage.

Phase 202 is a data voltage signal writing phase, and its equivalent circuit diagram is illustrated in FIG. 10. In this stage, the data line data is at a high level, and the scanning line scan is at a low level, which control the second and seventh TFTs T2 and T7 to be turned off, and control the third, fifth and sixth TFTs T3, T5 and T6 to be turned on the light-emitting control line EM is at a low level, which controls the first TFT T1 to be turned off.

Thus, the storage capacitor Cst discharges via the third TFT T3 and the fourth TFT T4, until the gate voltage of the fourth TFT T4 is Vdata+Vth, and at this point, the voltage between two ends of the storage capacitor Cst is VBA=VDD−Vdata−Vth.

Figure 11:
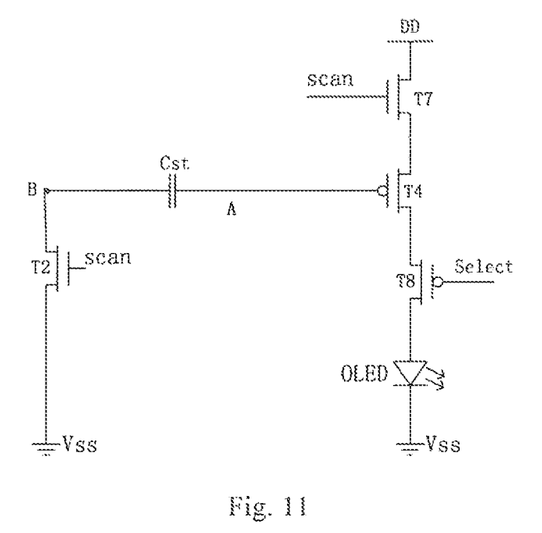
FIG. 11 is an equivalent circuit diagram of an OLED pixel circuit provided by Embodiment 1 of the present invention in the OLED light-emitting phase of the OLED light-emitting stage.

Phase 203 is an OLED OLED light-emitting phase, and its equivalent circuit diagram is illustrated in FIG. 11. In this phase, the data line data is at a low level, and the scanning line scan is at a high level, which control the second and seventh TFTs T2 and T7 to be turned on, and control the third, fifth and sixth TFTs T3, T5 and T6 to be turned off; the light-emitting control line EM is at a low level, which controls the first TFT T1 to be turned off.

Thus, the voltage at the second end B of the storage capacitor Cst is the GND voltage, namely, Vss, and at this point, at the first end of the storage capacitor Cst, that is, at the gate of the fourth TFT T4, voltage jump occurs because of floating, such that the voltage between the two ends of the storage capacitor Cst is constant, namely, VAB=Vdata+Vdd−VDD=Vgs. That is, the voltage between the two ends of the storage capacitor Cst equals to the voltage between the gate and the source of the fourth TFT T4. At this point, the current flowing through the fourth TFT T4 is:

$$I=k(Vgs-Vth)^2=k(Vdata+Vth-VDD-Vth)^2=k(Vdata-VDD)^2$$

It can be known from the above formula that this current is independent of both the threshold voltage Vth of the fourth TFT T4 and the voltage between the two ends of the OLED OLED, which basically eliminates the influence caused by non-uniformity and drift of the threshold voltage and non-uniformity of the electrical performance of the OLED OLED. As a result, the current flowing through the fourth TFT T4 is uniform, thereby the current flowing through the OLED OLED is also uniform. As the OLED OLED is a current mode light-emitting device, the OLED OLED has a uniform brightness, thus improving brightness uniformity of picture of the organic light-emitting display screen.

It should be noted that the data line voltage Vdata in phases 201 and 202 may vary in a range, as illustrated by the rectangle with hatching in FIG. 2, that is, any data line voltage within the certain range may allow the fourth TFT T4 to drive the OLED to emit light.

It should also be noted that during operation of the OLED pixel circuit, as response of the pixel circuit to input signals is made promptly, the time spent on switching between the above stage 1 and the stage 2 is extraordinary short, that is, detecting the touch-generating signal and then driving the OLED to emit light so as to display desired contents are completed in a very short period of time.

The drive method of the OLED pixel circuit of this embodiment has less control signals, simple timing, and an easy-to-implement circuit, and is convenient and practical.

Figure 3:
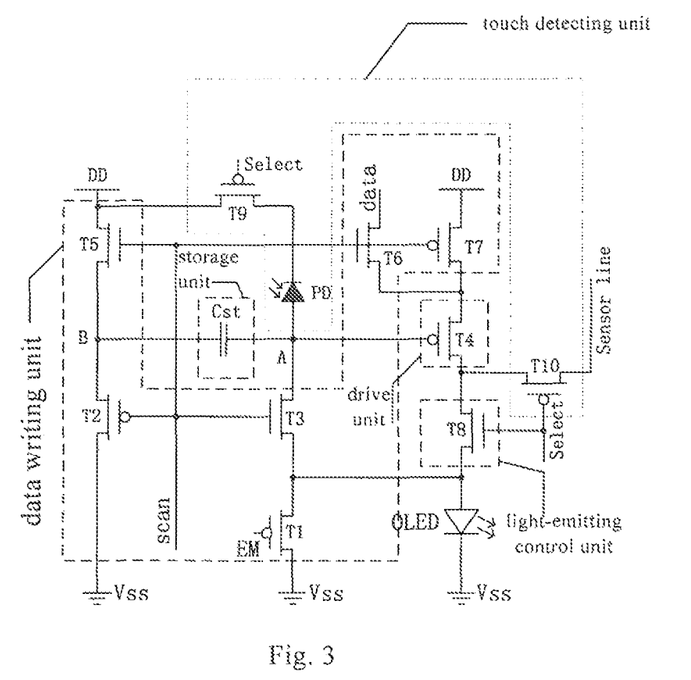
Figure 4:
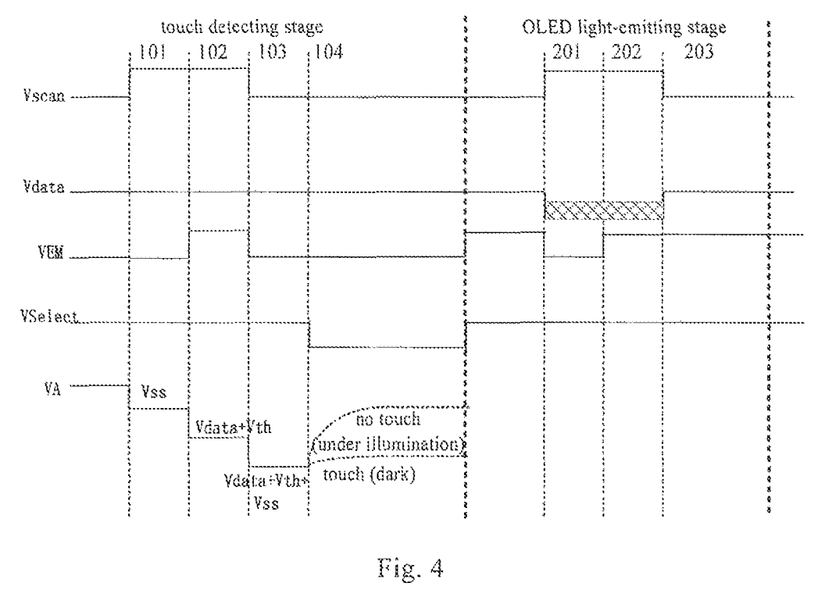

In addition, in this embodiment, the first TFT T1, the second TFT T2, the fourth TFT T4, the seventh TFT T7, the ninth TFT T9 and the tenth TFT T10 may be P-type TFTs, while the third TFT T3, the fifth TFT T5, the sixth TFT T6 and the eighth TFT T8 may be N-type TFTs, and in this condition, the circuit diagram of the pixel circuit is shown in FIG. 3. Accordingly, the timing diagram of driving the OLED pixel circuit of FIG. 3 is shown in FIG. 4, and since its operation process is similar to that shown in FIG. 2, it is not elaborated herein.

Obviously, by accordingly changing the control level and the type of the TFT, the on/off function of the TFT may also be achieved. For example, the first TFT is turned on under the control of a high level when it is an N-type TFT; alternatively, the first TFT may be a P-type TFT which is turned on under the control of a low level. According to this concept, the type of the respective TFTs, which are controlled by the same level control signal, in a certain unit of this embodiment may be changed, as long as this unit can achieve its original function without influencing the original functions of the other devices. For example, as long as the type of the second and seven TFTs is different from that of the third, fifth and sixth TFTs, the above-mentioned control on these TFTs may be achieved by controlling the level of the scanning line. Further, as long as the type of the ninth and tenth TFTs is different from that of the eighth TFT, the above-mentioned control on these TFTs may be achieved by controlling the level of the touch signal level control line.

Embodiment 2

This embodiment provides a display device, which comprises the above-described OLED pixel circuit, and other known structures such as a substrate. The display device may be an OLED display device or a product or component with display function, which uses OLED display technique, such as a mobile phone, a tablet computer, a television, a display, a notebook computer, a digital frame or a navigator.

The display device of this embodiment comprises the above-described OLED pixel circuit, and therefore, it is thinner in overall thickness, lighter in weight, and lower in production cost. By providing the above circuit in each sub-pixel, sensitivity of the display screen to a touch may be significantly improved, furthermore, the photodiode works by sensing changes of light, and therefore, floating touch can be achieved on the display screen.

It should be understood that the above implementations are merely exemplary implementations used for explaining the principle of the present invention, but the present invention is not limited thereto. For the person skilled in the art, various variations and improvements may be made without departing from the spirit and essence of the present invention. These variations and improvements are also deemed as the protection scope of the present invention.

What is claimed is:

1. An OLED pixel circuit, comprising:
a data writing unit, a storage unit, a drive unit, an OLED, a light-emitting control unit and a touch detecting unit; wherein,
the data writing unit, in a touch detecting stage and an OLED light-emitting stage, is used for writing a power supply voltage signal into the storage unit under the control of a light-emitting control line and a scanning line, and writing a data line voltage signal into the storage unit under the control of the scanning line;
the storage unit is used for supplying voltage to the drive unit;
the touch detecting unit, in the touch detecting stage, is used for sensing touch under the control of a touch signal level control line, and generating a detecting signal;
the drive unit, in the touch detecting stage, is used for converting the detecting signal into a touch output signal, which is output via the touch detecting unit, under the control of the touch signal level control line, and, in the OLED light-emitting stage, is used for providing drive current for the OLED; and
the light-emitting control unit, in the OLED light-emitting stage, is used for turning on the drive unit and the OLED under the control of the touch signal level control line.

2. The OLED pixel circuit of claim 1, wherein the storage unit comprises a storage capacitor.

3. The OLED pixel circuit of claim 2, wherein the drive unit comprises a fourth TFT, and a gate of the fourth TFT is connected to a first end of the storage capacitor.

4. The OLED pixel circuit of claim 3, wherein the data writing unit comprises a first TFT, a second TFT, a third TFT, a fifth TFT, a sixth TFT and a seventh TFT; wherein,
a gate of the first TFT is connected to the light-emitting control line, and a drain of the first TFT is grounded;
a gate of the second TFT is connected to the scanning line, and a drain of the second TFT is grounded;
a gate of the third TFT is connected to the scanning line, and a drain of the third TFT is connected to a source of the first TFT;
a gate of the fifth TFT is connected to the scanning line, a source of the fifth TFT is connected to a power line, and a drain of the fifth TFT is connected to a second end of the storage capacitor and a source of the second TFT;
a gate of the sixth TFT is connected to the scanning line, a source of the sixth TFT is connected to the data line, and a drain of the sixth TFT is connected to a source of the fourth TFT; and
a gate of the seventh TFT is connected to the scanning line, a source of the seventh TFT is connected to the power line, and a drain of the seventh TFT is connected to the source of the fourth TFT.

5. The OLED pixel circuit of claim 4, wherein a cathode of the OLED is grounded.

6. The OLED pixel circuit of claim 5, wherein the light-emitting control unit comprises a eighth TFT, a source of the eighth TFT is connected to a drain of the fourth TFT, a gate of the eighth TFT is connected to the touch signal level control line, and a drain of the eighth TFT is connected to the source of the first TFT and an anode of the OLED.

7. The OLED pixel circuit of claim 6, wherein the touch detecting unit comprises a photodiode, a ninth TFT and a tenth TFT, wherein,
a cathode of the photodiode is connected to the first end of the storage capacitor;
a source of the ninth TFT is connected to the power line, a drain of the ninth TFT is connected to an anode of the photodiode, and a gate of the ninth TFT is connected to the touch signal level control line; and
a source of the tenth TFT is connected to the drain of the fourth TFT, a gate of the tenth TFT is connected to the touch signal level control line, and a drain of the tenth TFT is connected to a sensor line.

8. The OLED pixel circuit of claim 7, wherein a type of the second TFT and the seventh TFT is different from that of the third TFT, the fifth TFT and the sixth TFT; a type of the ninth TFT and the tenth TFT is different from that of the eighth TFT; and the fourth TFT is a P-type TFT.

9. The OLED pixel circuit of claim 8, wherein the first TFT, the second TFT, the seventh TFT, the ninth TFT and the tenth TFT are N-type TFTs, while the third TFT, the fourth TFT, the fifth TFT, the sixth TFT and the eighth TFT are P-type TFTs; or
the first TFT, the second TFT, the seventh TFT, the ninth TFT, the fourth TFT and the tenth TFT are P-type TFTs, while the third TFT, the fifth TFT, the sixth TFT and the eighth TFT are N-type TFTs.

10. The OLED pixel circuit of claim 7, wherein the first to ninth TFTs are any one of polycrystalline silicon TFT, monocrystalline silicon TFT, oxide TFT and organic TFT.

11. The OLED pixel circuit of claim 1, wherein the OLED is a top-emitting OLED.

12. A display device, comprising the OLED pixel circuit of claim 1.

13. A drive method of the OLED pixel circuit of claim 7, comprising a touch detecting stage and an OLED light-emitting stage, wherein, the touch detecting stage comprises:
the scanning line controlling the second TFT and the seventh TFT to be turned off, and controlling the third TFT, the fifth TFT and the sixth TFT to be turned on, the light-emitting control line controlling the first TFT to be turned on, the touch signal level control line controlling the eighth TFT to be turned on, and controlling the touch detecting unit to be turned off, and the fourth TFT going into saturation state;
the scanning line controlling the second TFT and the seventh TFT to be turned off, and controlling the third TFT, the fifth TFT and the sixth TFT to be turned on, the light-emitting control line controlling the first TFT to be turned off, and the touch signal level control line controlling the eighth TFT to be turned on, and controlling the touch detecting module to be turned off;
the scanning line controlling the second TFT and the seventh TFT to be turned on, and controlling the third TFT, the fifth TFT and the sixth TFT to be turned off, the light-emitting control line controlling the first TFT to be turned on, and the touch signal level control line controlling the eighth TFT to be turned on, and controlling the touch detecting module to be turned off; and
the scanning line controlling the second TFT and the seventh TFT to be turned on, and controlling the third TFT, the fifth TFT and the sixth TFT to be turned off, the light-emitting control line controlling the first TFT to be turned on, and the touch signal level control line controlling the eighth TFT to be turned off, and controlling the touch detecting module to be turned on, and wherein
in the OLED light-emitting stage, the touch signal level control line controls the touch detecting module to be turned off, and controls the eighth TFT to be turned on, and the OLED light-emitting stage comprises:
the scanning line controlling the second TFT and the seventh TFT to be turned off, and controlling the third TFT, the fifth TFT and the sixth TFT to be turned on, the light-emitting control line controlling the first TFT to be turned on, and the fourth TFT going into saturation;
the scanning line controlling the second TFT and the seventh TFT to be turned off, and controlling the third TFT, the fifth TFT and the sixth TFT to be turned on, and the light-emitting control line controlling the first TFT to be turned off; and
the scanning line controlling the second TFT and the seventh TFT to be turned on, and controlling the third TFT, the fifth TFT and the sixth TFT to be turned off, the light-emitting control line controlling the first TFT to be turned off, and the fourth TFT driving the OLED to emit light.

14. The OLED pixel circuit of claim 8, wherein the first to ninth TFTs are any one of polycrystalline silicon TFT, monocrystalline silicon TFT, oxide TFT and organic TFT.

15. The OLED pixel circuit of claim 9, wherein the first to ninth TFTs are any one of polycrystalline silicon TFT, monocrystalline silicon TFT, oxide TFT and organic TFT.

* * * * *